May 3, 1927.
F. P. LIVINGSTON
1,626,618
RETAINING VALVE DEVICE
Filed July 17, 1926
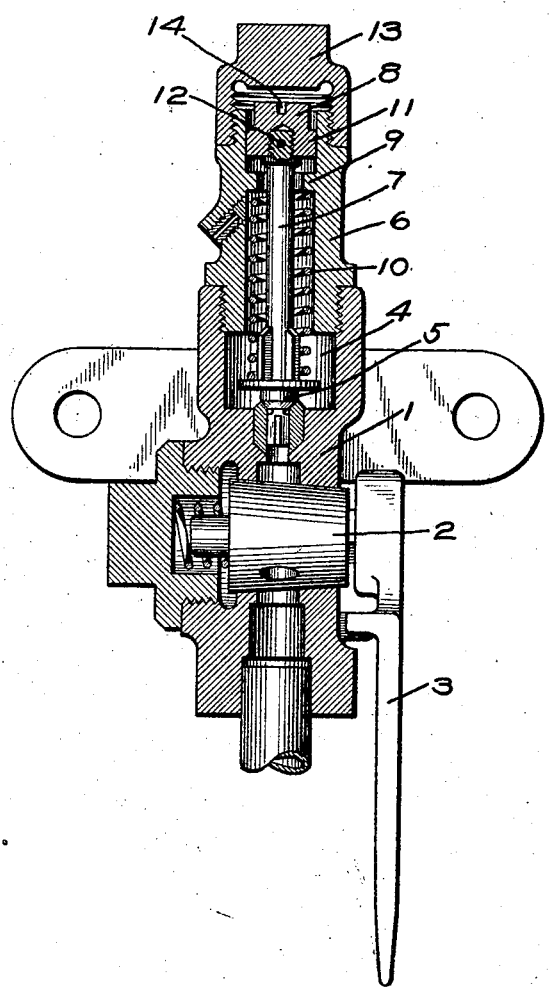
INVENTOR
FREMONT P. LIVINGSTON
BY *Wm. M. Cady*
ATTORNEY Patented May 3, 1927.

1,626,618

UNITED STATES PATENT OFFICE.

TREMONT P. LIVINGSTON, OF DENVER, COLORADO, ASSIGNOR TO THE WESTINGHOUSE AIR BRAKE COMPANY, OF WILMERDING, PENNSYLVANIA, A CORPORATION OF PENNSYLVANIA.

RETAINING-VALVE DEVICE.

Application filed July 17, 1926. Serial No. 123,087.

This invention relates to retaining valve devices of the type employed on railway cars for retaining fluid under pressure in the brake cylinder.

The retaining valve device heretofore employed comprises a body portion containing a retaining valve, a coil spring acting on the retaining valve and a cap nut having screw-threaded engagement with the body portion and adapted to hold the spring under compression.

With this construction, when the cap nut is removed, in order to clean the valve seat and to permit regrinding of the valve seat, the spring is exposed and free and is sometimes stretched or compressed by the operator before it is replaced, thereby changing the desired pressure value of the retainer.

The principal object of my invention is to provide a pressure retaining valve device, in which the valve is readily accessible for grinding and cleaning purposes, but in which the construction is such that the spring cannot be easily tampered with.

In the accompanying drawing, the single figure is a central sectional view of a retaining valve device embodying my invention.

As shown in the drawing, the retaining valve device may comprise the usual body portion 1 having mounted therein a plug valve 2 adapted to be operated by a handle 3. The body portion is provided with a valve chamber 4, containing a retaining valve 5.

A barrel section 6 is provided having screw-threaded engagement in the body portion. The valve 5 is provided with a stem 7 which extends through the bore of the barrel and has its end threaded to receive a nut 8. Within the barrel near the upper end an annular shoulder 9 is provided and interposed between said shoulder and a collar carried by the valve 5, and surrounding the stem 7 is a coil spring 10. The nut 8 is provided with an annular guide portion 11 which is guided in the bore of the barrel 6.

In order to assemble the parts, the stem 7 with the spring 10 placed in position, is inserted in the barrel 6 and is pushed upwardly, compressing the spring 10 against the shoulder 9 sufficiently to permit the nut 11 to be applied to the end of the stem, and then a pin 12 is driven through alined openings in the stem 7 and the nut 8 while the stem is held in a position above the end of the barrel and exposing said openings. The valve 5 and its stem are then released and the nut 11 is moved down by the spring 10, but its downward movement is limited by engagement with the shoulder 9.

A cap nut 13 is then applied to the upper end of the barrel and said barrel is ready to be screwed into the body portion 1.

If it is desired to clean or inspect the seat of the valve 5, this may be done by unscrewing the barrel section 6, or the valve seat may be reground by merely removing the cap nut 13, so that the nut 8 may be rotated to rotate the valve 5 on its seat by means of the screw driver slot 14 which is provided on the nut 8.

If the barrel is removed, it will be seen that the spring 10 remains assembled with the barrel, so that the spring cannot be easily tampered with and the spring can only be removed by pushing up the valve stem 7 so as to permit the pin 12 to be driven out, and then the nut 8 may be unscrewed, permitting the stem 7 and the spring 10 to be disassembled.

Having now described my invention, what I claim as new and desire to secure by Letters Patent, is:—

1. In a pressure retaining valve device, the combination with a valve body having a valve seat, of a barrel adapted to be secured to said body, a valve for engaging said seat, a stem carried by said valve and positioned in said barrel, a spring mounted in said barrel and acting on said valve, and means for holding said stem in said barrel.

2. In a pressure retaining valve device, the combination with a valve body having a valve seat, of a barrel adapted to be secured to said body and having a spring chamber, a valve for engaging said seat, a stem carried by said valve and extending through said chamber, a nut having screw-threaded engagement with the end of said stem, a pin for securing said nut to the stem, and a spring mounted in said chamber and acting on said valve.

3. In a pressure retaining valve device, the combination with a valve body having a valve seat and a valve chamber, of a valve in said chamber engaging said seat, a barrel having screw-threaded engagement with said valve body, a stem carried by said valve and extending through the bore of the barrel, a shoulder within the bore of the barrel, a spring interposed between said shoulder and said valve, a nut secured to the end of said stem, and a pin for securing said nut to said stem.

In testimony whereof I have hereunto set my hand.

FREMONT P. LIVINGSTON.